United States Patent [19]
Miyawaki

[11] 3,877,479
[45] Apr. 15, 1975

[54] STEAM TRAP

[76] Inventor: Sentaro Miyawaki, 26-32, 3-chome, Nishi, Senriyama, Suita Osaka-fu, Japan

[22] Filed: July 26, 1973

[21] Appl. No.: 383,016

Related U.S. Application Data

[63] Continuation-in-part of Ser. No. 170,907, Aug. 11, 1971, abandoned.

[30] Foreign Application Priority Data

Aug. 15, 1970 Japan.................................. 45-71616

[52] U.S. Cl................................. 137/185; 251/38
[51] Int. Cl................................................ F16t 1/30
[58] Field of Search .......... 137/184, 185, 190, 191, 137/415, 630, 630.14, 630.15; 251/38

[56] References Cited
UNITED STATES PATENTS

| 742,308 | 10/1903 | Gerrard | 137/184 |
|---|---|---|---|
| 2,024,774 | 12/1935 | Mastenbrook | 137/185 |
| 2,790,456 | 4/1957 | Shaw et al. | 137/184 |
| 3,351,316 | 11/1967 | Lewis et al. | 251/38 X |
| 3,431,028 | 3/1969 | Yoder | 137/513.5 X |

FOREIGN PATENTS OR APPLICATIONS

| 412,448 | 6/1934 | United Kingdom | 137/184 |
|---|---|---|---|
| 389,614 | 3/1933 | United Kingdom | 137/190 |
| 425,827 | 3/1935 | United Kingdom | 137/184 |

Primary Examiner—Alan Cohan
Assistant Examiner—Gerald A. Michalsky
Attorney, Agent, or Firm—Sughrue, Rothwell, Mion, Zinn & Macpeak

[57] ABSTRACT

A bell-float type steam trap having a double-action trapping unit with a draining valve and a pilot valve. A large draining capacity is ensured through the draining valve while accurately controlling the draining operation by the pilot valve. Wear and tear of the pilot valve are prevented by diverting its striking impact through a shoulder portion having a comparatively wider contact area, which is separate from the contact area of the conic pilot valve.

3 Claims, 9 Drawing Figures

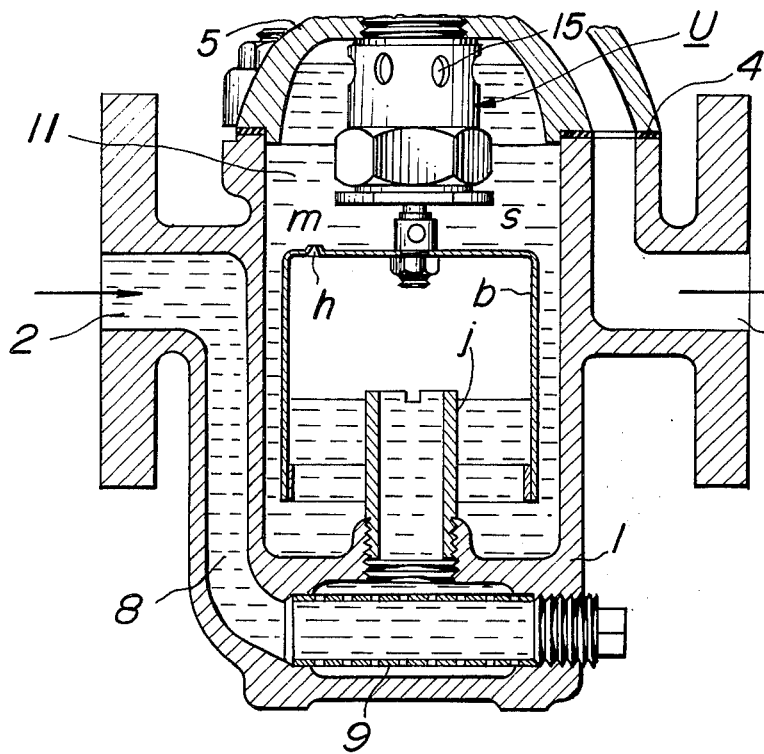
FIG_1
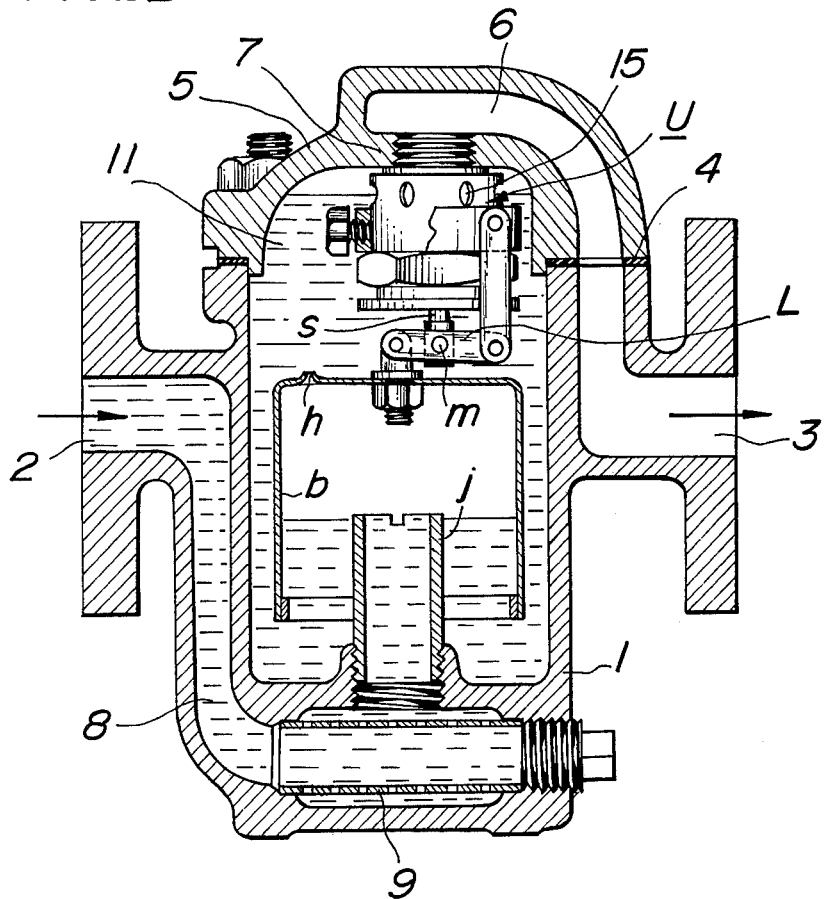
FIG_2

FIG_3A
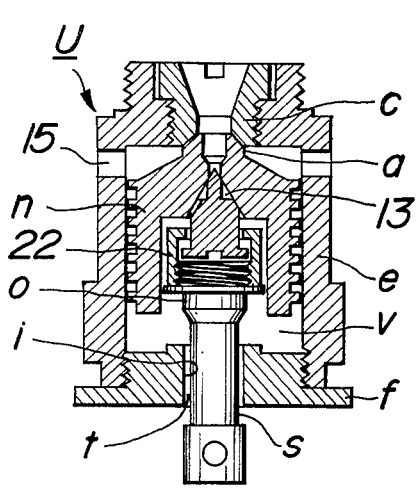
FIG_4A
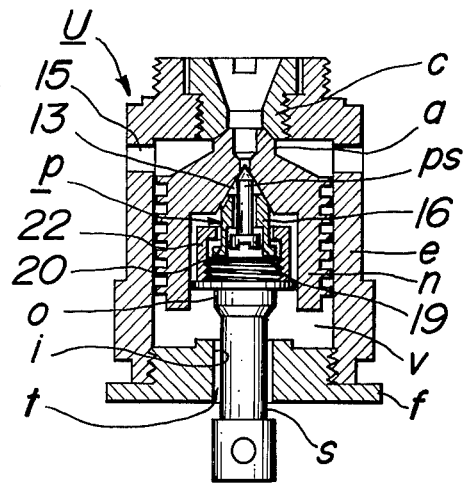
FIG_3B
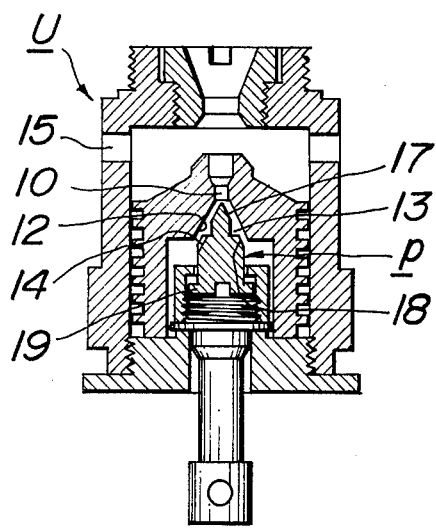
FIG_4B
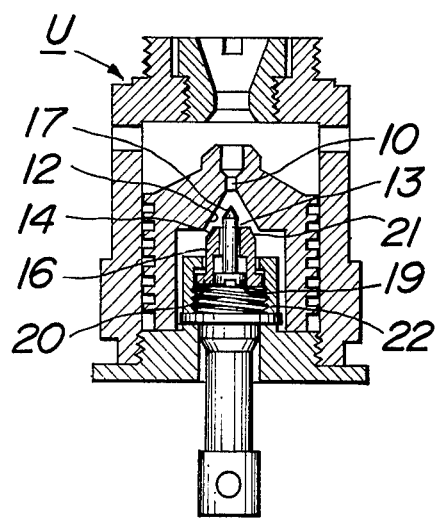

FIG_5
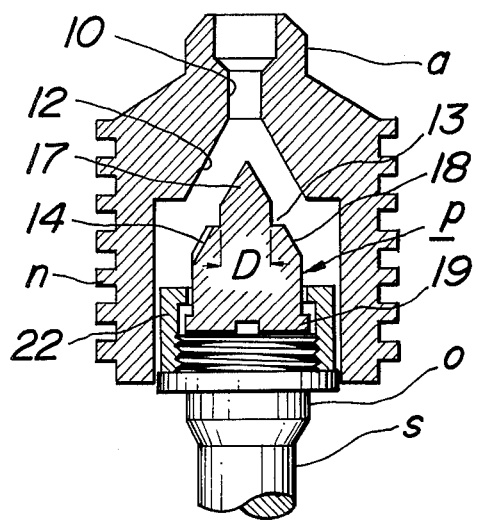
FIG_6
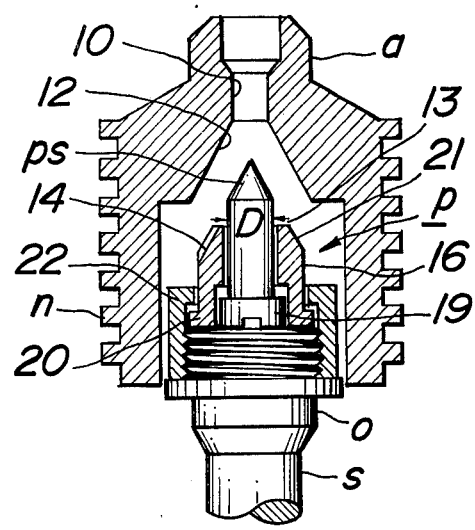
FIG_7
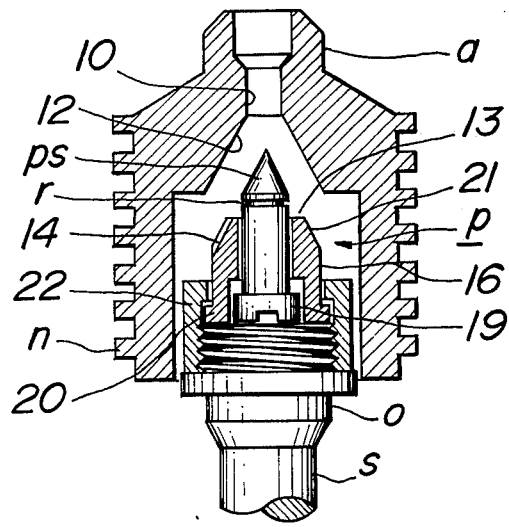

STEAM TRAP

This application is a continuation-in-part application of the U.S. Pat. Application Ser. No. 170,907, which was originally filed on Aug. 11, 1971 now abandoned.

BACKGROUND OF THE INVENTION

1. Field of the Invention

This invention relates to a steam trap, and more particularly to a bell-float type steam trap having a double-action trapping unit including a draining valve and a pilot valve, which ensures a large condensate draining capacity through the draining valve while ensuring accurate operation by the pilot valve. The closing impact of the pilot valve is diverted to a shoulder means so as to maintain an accurate pressure acting area which is determined by the diameter of the pilot valve.

2. Description of the Prior Art

Bell-float type steam trap was invented in 1911 by the founder of the Armstrong Machine Works, Three Rivers, Mich., U.S.A. U.S. Pat. No. 3,114,383, which was granted to E. L. Myers on Dec. 17, 1973, teaches an improvement of such bell-float type steam trap. An important feature of the bell-float type steam trap is its intrinsic freedom from air-locking. British Pat. No. 389,614 of Frank Campbell et al. and British Pat. No. 412,448 of Alexander H. Hayes teach certain improvements of steam traps with upwardly directed buckets. However, it is difficult to completely eliminate the risk of airlocking in the steam trap upwardly-directed bucket type steam trap, and Campbell intends to prevent the airlocking, but the Campbell's steam trap involves unavoidable waste of useful steam.

The bell-float type steam trap of Myers has a shortcoming in that it cannot drain a large amount of condensate at a high speed. The inventor of the present invention provides a bell-float type steam trap having a large capacity of draining condensate, by using a double-action trapping unit, which includes a draining valve with a large port and a pilot valve with a small diameter but accurate operating characteristics. More particularly, with the double-action trapping unit of the invention, the draining of a large amount of the condensate is ensured through the drain valve, while the opening and closing operation of the drain valve is controlled by a pilot valve of accurate dimensions.

With the double-action type trapping unit which is used in the bell-float type steam trap of the invention, the high-speed draining of the condensate inevitably causes quick shifting of the fluid in the bell float from liquid condensate to gaseous steam. Accordingly, a large acceleration is caused in the trapping unit toward the end of each draining period, which results in a large closing impact of a valve member. With the double-action type trapping unit to be used in the steam trap of the present invention, such large closing impact may be applied to the pilot valve of small size. Thus, the wear and tear of the small pilot valve is accelerated as the draining capacity of the steam trap increases. The wear and tear of the pilot valve is, of course, detrimental to the stable and accurate operation of the steam trap.

On the other hand, it is a recent trend in various industries to automate and centralize the control and operation of large plants. Thus, there is an ever increasisng demand for high reliability of the individual elements in large industrial plants, and steam trap cannot be an exception of such elements which are required to have a high reliability.

Therefore, an object of the present invention is to meet such a need for a steam trap with a large condensate draining capacity and a high reliability of the operation.

SUMMARY OF THE INVENTION

The steam trap of the present invention includes a double-action trapping unit which includes a draining valve engageable with a draining port and a pilot valve engageable with a central passage bored through the draining valve. The trapping unit further includes a guide cylinder depending from a partition wall of the steam trap, and the draining valve is a piston which is slidably fitted in the guide cylinder. A gland bush is secured to the lower end of the guide cylinder so as to define a pressure chamber between the gland bush and the slidable piston. A valve stem extends through the gland bush, so as to connect a pilot valve disposed in the pressure chamber to a bell float in the steam trap. A central passage is bored through the valve, so as to extend along the longitudinal central axis thereof.

The draining port cooperating with the draining valve has a diameter which is not less than three times the diameter of the effective diameter of the pilot valve. What is meant by the effective diameter of the pilot valve is the diameter of that portion of the pilot valve which closingly engages the central passage of the piston. The use of the large draining port ensures the large condensate draining capacity of the steam trap, while the comparatively small effective diameter of the pilot valve ensures dependable accurate draining operation of the steam trap.

To ensure reliable action, the top portion of the pilot valve is made convex conical shape, and the coacting valve port at the lower end of the central passage of the piston is made concave conical. Furthermore, to reduce the closing impact at the conical top portion of the pilot valve, a conical shoulder is provided at the top portion of the valve stem which strikes the concave conical lower end portion of the central passage just prior to or simultaneously with the closing contact of the pilot valve with the central passage. Thereby, wear and tear of the pilot valve is so reduced that accurate performance of the steam trap can be ensured.

To use the diameter of the pilot valve top portion as the effective pressure receiving area which controls the opening and closing action of the pilot valve, grooves are formed on the surface of the shoulder portion for delivering the pressure of pressure chamber to the pilot valve.

With the structure according to the present invention, it is also possible to form an annular groove on the cylindrical surface of the top portion of the pilot valve just below the conical top thereof. Such annular groove allows the fluid stream toward the central passage of the piston to catch the pilot valve so as to ensure reliable closing action thereof.

BRIEF DESCRIPTION OF THE DRAWING

For a better understanding of the invention, reference is made to the accompanying drawing, in which:

FIG. 1 is a schematic sectional view of a bell-float type steam trap having a trapping unit U with a pilot valve and a valve operating mechanism, according to the present invention;

FIG. 2 is a schematic sectional view of a modification of the steam trap of FIG. 1, by adding an amplifying lever means thereto;

FIGS. 3A and 3B are schematic diagrams, illustrating open and close positions of a trapping unit U with a pilot valve, which is usable in the steam trap, as illustrated in FIG. 1 or 2;

FIGS. 4A and 4B are schematic diagrams similar to FIGS. 3A and 3B, which illustrate another embodiment of the trapping unit U;

FIGS. 5 and 6 are enlarged partial sectional views, showing the manner in which closing impact of the pilot valve $p$ is diverted in the trapping unit U of FIGS. 3A, 3B and 4A, 4B, respectively; and FIG. 7 is a schematic sectional view of a modification of the pilot valve $p$ to be used in the trapping unit U according to the present invention.

Like parts are designated by like numerals and symbols throughout the drawing.

DETAILED DESCRIPTION OF THE PREFERRED EMBODIMENTS

A steam trap, as illustrated in FIGS. 1 and 2, comprises a body 1 having an inlet 2 and an outlet 3. A cover 5 is secured to the upper part of the body 1, while inserting a packing 4 therebetween. The cover 5 has an outlet passage 6 and a partition wall which has a tapped hole 7. A trapping unit U is threadedly mounted on the tapped hole 7 of the partition wall of the cover 6.

A bell float $b$ having a vent hole $h$ bored through the top wall thereof is disposed in the body 1. In the embodiment of FIG. 1, the lower end of a valve stem $s$ is pivotally connected to the bell float $b$ by a pin $m$. The upper end of the valve stem $s$ is connected to the trapping unit U in a manner to be described hereinafter. The inside space of the bell float $b$ communicates with the inlet 2 of the body 1 through an inlet passage 8, a strainer 9, and a tubular injector $j$. In the illustrated embodiment, the strainer 9 and the tubular injector $j$ are threadedly mounted to the wall of the body 1.

The double-action type operation of the trapping unit U of the present invention will now be described by referring to the steam traps of FIGS. 1 and 2 and trapping units U of FIGS. 3A, 3B, 4A and 4B. The trapping unit U includes a hollow guide cylinder $e$, a piston $n$ slidably disposed in the guide cylinder $e$, and a gland bush $f$ threadedly secured to the bottom of the guide cylinder $e$ so as to define a pressure chamber $v$ between the gland bush $f$ and the piston $n$. A central hole $i$ is bored through the gland bush $f$, so as to allow the valve stem $s$ to extend therethrough. The top surface of the piston $n$ has a draining valve $a$ integrally formed therewith, and a central passage 10 is bored along the longitudinal central axis of the piston $n$. In the embodiment of FIGS. 3A and 3B, a pilot valve set $p$ is mounted on the top end of the valve stem $s$ by a cap nut 22. The pilot valve set $p$ of this example comprises a unitary pilot valve $p$. When the trapping unit U is at its blocking position or closed position, the pilot valve set $p$ engages the piston $n$, as shown in FIG. 3A. As the bell float $b$ moves downwards or sinks in the body 1, the pilot valve set $p$ also moves downwards, together with the valve stem $s$. Accordingly, the central passage 10 of the piston $n$ is at first opened.

As the central passage 10 is opened, the condensate in the pressure chamber $v$ below the piston $n$ is drained to the outlet 3 through the passage 10, and the outlet passage 6. At this moment, the inside pressure of condensate pool 11 of the body 1 is directly delivered to the pressure chamber $v$ through gap $t$ between the valve stem $s$ and the inner wall of the central hole $i$ of the gland bush $f$, because the condensate in the pool 11 is continuously forced to the chamber $v$. Thus, the pressure in the chamber $v$ is kept at the same level as the condensate pool 11. On the other hand, the pressure at the outlet passage 6 is at the atmospheric pressure level, and the atmospheric pressure acts on the upper surface of the drain valve $a$, so that the pressure in the chamber $v$ surpasses the pressure acting on the top surface of the piston $n$. Whereby, the piston $n$ is kept at its upper most position where it engages a drain valve port of the main valve set $c$.

When the amount of the liquid drain in the bell float $b$ increases to a predetermined level, flange portion $o$ of the valve stem $s$ blocks the central hole $i$, so that the condensate flow from the pool 11 to the chamber $v$ is interrupted. As a result, the pressure in the chamber $v$ is suddenly dropped to the atmospheric pressure of the outlet passage 6. Thus, the pressure in the chamber $v$ is switched from the pressure of the condensate pool 11 to the pressure of the outlet passage 6. Accordingly, the pressure of the condensate pool 11, which acts on the upper surface of the piston $n$ through drain holes 15 bored at the upper end of the guide cylinder $e$, surpasses the pressure in the chamber $v$, so that the piston $n$ quickly moves downwards, as shown in FIG. 3B. Consequently, a drain port of the main valve seat $c$ is opened, and the condensate in the pool 11 is rapidly drained to the outlet passage 6 through the aforesaid drain holes 15 of the guide cylinder $e$ and the drain port of the main valve seat $c$.

It is an important feature of the present invention that the diameter of the drain port of the main valve seat $c$ is not smaller than three times the diameter of the central passage 10 of the piston $n$. Whereby, a large capacity of draining the condensate is ensured, while maintaining accurate operation of the drain valve $a$ by precisely controlling the operation of the pilot valve set $p$. In the embodiment of FIGS. 4A and 4B, the pilot valve set $p$ consists of a small-diameter needle valve PS and a valve holding ring 16, but the operation of the pilot valve set $p$ is essentially identical with that of FIGS. 3A and 3B.

When the draining operation of the condensate is about to end, gas-phase steam flows into the bell float $b$ from the inlet 2 of the steam trap casing 1, so that buoyancy acting on the bell float $b$ increases and the bell float $b$ moves upward together with the stem $s$. As the flange $o$ of the stem $s$ leaves central hole $i$ of the gland bush $f$, the pressure chamber $v$ communicates with the condensate pool 11. Accordingly, the pressure in the chamber $v$ increases to the pressure level of the condensate chamber 11, so as to push the piston $n$ upwards for closing the drain port of the main valve seat $c$ by the drain valve $a$.

Thus, the steam trap performs the drainage of the condensate substantially at uniform intervals.

In the embodiment of FIG. 2, a valve stem $s$ secured to a pilot valve set $p$ is pivotally connected to a lever L by a pin $m$, which lever L has one end pivotally connected to a stationary member extending from the trapping unit U and the opposite end thereof pivotally connected to the top end of a bell float $b$. The operation of the valve stem $s$ of this embodiment is similar to that of FIGS. 3A and 3B except that the buoyancy acting on the float $b$ is amplified by the lever L before it is delivered to the valve stem $s$. Whereby, a high operating force can be obtained with a small steam trap.

It should be noted here that when the double-action trapping unit U is to close the valves $a$ and $p$, the closing impact of the pilot valve set $p$ to the valve seat at the lower end of the central passage 10 of the piston $n$ is very large. This is because the steam trap of the present invention has a large draining capacity: namely, the draining port of the main valve seat $c$ has a large diameter of not smaller than three times the diameter of the central passage 10 of the piston $n$, so that the drainage of the condensate is carried out at a high speed, which results in a quick change of the fluid inside the bell-float $b$ from liquid condensate to gas-phase steam for causing rapid rise of the buoyancy. The rapid rise of the buoyancy tends to force the pilot valve set $p$ to strike the coacting valve seat of the piston $n$ at a high speed. The large closing impact of the pilot valve set $p$ is, of course, a major cause of fast wearing thereof, which is detrimental to the accurate valve operation and service life of the steam trap.

Such closing impact of the pilot valve set $p$ becomes larger as the pilot valve set $p$ itself becomes smaller. On the other hand, there is a need to use a small pilot valve set $p$ for providing a compact steam trap. Accordingly, one of the features of the present invention is mitigate the problem of such large closing impact by the following two means: i.e., the use of conical contact between the pilot valve set $p$ and its coacting valve seat, and the use of an impact-receiving shoulder. Such feature of the invention will now be described in further detail by referring to the two embodiments of the invention.

I. In FIGS. 3A and 3B, the top surface of the unitary pilot valve $p$ is convex conical, and the lower end of the central passage 10 of the piston $n$ is provided with a concave conical surface 12 so as to receive a closing head portion 17 of the pilot valve $p$ while making surface contact therewith, rather than line contact therewith. This surface contact apparently reduces the closing impact per unit area of the top surface of the pilot valve set, so that the wearing of the pilot valve is materially reduced.

Furthermore, the concave conical surface 12 at the lower end of the central passage 10 is made much larger then the closing head portion 17 of the pilot valve set $p$, i.e., the diameter of the base portion of the conical surface of the piston $n$ is much greater than the maximum diameter D (FIG. 5) of the convex conical top surface portion of the pilot valve set $p$. The pilot valve set $p$ of FIGS. 3A and 3B has a bottom flange 19, which is connected to the top of the valve stem $s$ by a cap nut 22. The large concave conical surface at the lower end of the piston $n$ is to provide a contact surface with a conical shoulder 18 of the pilot piston set $p$. Thus, the shoulder portion 18 provides a further surface contact area with the piston $n$, so as to further reduce the closing impact to the pilot valve set $p$.

More particularly, with the unitary pilot valve set $p$, a peripheral groove 13 is so cut as to define the accurate dimension of the maximum diameter D of the closing head portion 17 of the pilot valve set $p$. One or more pressure passages 14 are provided on the conical top surface of the shoulder 18, so as to communicate the peripheral groove 13 to the pressure chamber $v$ when the pilot valve set $p$ is at the closing position in engagement with the piston $n$. Thus, the diameter D of the closing portion 17 defines the effective area for receiving the pressure from the pressure chamber $v$ when the trapping unit is closed. The diameter D also plays a critical role in deciding the valve opening conditions, which depend on the minimum gaseous volume in the bell float $b$ and the steam pressure of the system in which the steam trap is used.

Thus, accurate valve opening and closing operation can be ensured by accurately determining the diameter D of the closing head portion 17 of the pilot valve set $p$. In addition, the wear and tear of the closing head portion 17 is prevented by bearing the closing impact by the wide conical surface contact plus the wide contact surface of the shoulder portion 18. As a result, fast wear and tear of one element, i.e., the pilot valve set $p$, in the steam trap is eliminated, so that service life of the steam trap as a whole can be improved. In other words, even wear and tear of various elements of the steam trap can be provided, so as to improve the reliability of the steam trap and to optimize the operation and production cost thereof.

II. In FIGS. 4A and 4B, a concave conical surface 12 is formed at the lower end of the piston $n$, as in the case of the embodiment of FIGS. 3A and 3B. The closing head portion 17 is a unitary part of the pilot valve set $p$ in the preceding embodiment, but a separate small-diameter needle valve PS of diameter D (see FIG. 6) is used in this embodiment. The needle valve PS has a convex conical surface which can closingly engage the concave valve seat surface 12 of the piston $n$. The needle valve PS is carried by a valve holding ring 16, which acts as a detent of the bottom flange 19$a$ of the needle PS. The valve holding ring 16 has a bottom flange 20, which is in turn operatively connected to the top of the valve stem $s$ by a cap nut 22. The valve holding ring 16 has conical shoulder 21, which corresponds to the shoulder 18 of the preceding embodiment. One or more pressure passage 14 is formed on the conical surface of the shoulder 21, for communicating the immediate surrounding 13 of the needle valve PS with the pressure chamber $v$ when the pilot valve set $p$ is closed. As a result, the diameter D of the needle valve PS fulfills the same important role of determining the valve closing and opening conditions as the diameter D of the closing head portion 17 of the preceding embodiment.

With the embodiment of FIGS. 4A and 4B, when the draining operation of the condensate is about to end, the buoyancy acting on the bell float $b$ accelerates the pilot valve set $p$ toward the pistion $n$ at a high speed. In this case, the shoulder portion 21 of the valve holding ring 16 at first strikes the concave conical surface 12 of the piston $n$. Then, the buoyancy of the bell float $b$ acts to push the piston $n$ upwards through the contact between the concave conical surface 12 and the shoulder 21. The small-diameter needle valve PS comes into contact with the concave conical surface 12 of the pistion $n$ only at about the time when the draining valve $a$ of the piston $n$ closes the draining portion of the main valve seat $c$. The fluid flow through the central passage 10 of the piston $n$ acts to pull the needle valve PS to the concave conical surface 12. As a result, the convex conical surface at the top of the needle valve PS is completely freed from the closing impact, because the mass of the needle valve PS itself is comparatively small and the striking of the valve seating surface 12 by the needle valve PS is separated from the quick upward movement of the bell float b.

FIG. 7 illustrates a modification of the embodiment of FIG. 6, by providing an annular groove r on the cylindrical peripheral surface of the needle valve PS in the proximity of the convex conical top surface. Such annular groove r acts to ensure the smooth movement of the needle valve PS along with the fluid flow through the central passage 10. Whereby, stable and reliable operation of the pilot valve set p is ensured.

As described in detail in the foregoing, the steam trap of the structure according to the present invention, the durability of the most wearable pilot valve set is improved to the level of the durability of other parts or elements of the steam trap. Whereby, the uniform wear of different parts of the steam trap is ensured. As a result, accurate dimension of the effective pressure receiving area of the pilot valve set is maintained for a long period of time, so that the double-action trapping unit in the steam trap of the present invention performs its duty very accurately. Thus, the reliability of the steam trap as a whole is improved. Furthermore, with the large draining port, along with the accurately operative pilot valve set, the steam trap of the present invention provides a large capacity of draining condensate under accurate control.

I claim:

1. In a bell-float type stream trap with a double-action trapping unit having a casing with a cover including a partition wall; a bell float disposed in the casing so as to receive fluid; a trapping unit secured to said cover, said trapping unit including a guide cylinder depending from the cover partition wall, a hollow piston having a central passage and being slidably disposed in the guide cylinder, a main valve seat arranged coaxially with the guide cylinder, said main valve seat having a drain valve port coaxially therethrough, the diameter of said drain valve port being not smaller than three times the diameter of said central passage of the hollow piston, said hollow piston acting as a drain valve engageable with said main valve seat, a gland bush secured to the lower end of the guide cylinder so as to define a pressure chamber between the gland bush and the piston, a pilot valve closingly engageable with said central passage of the piston from the pressure chamber, a valve stem extending through said gland bush for connecting said pilot valve to said bell float, the pressure in the pressure chamber being switched between internal pressure of the casing and outlet pressure in response to the action of said pilot valve, said guide cylinder having at least one opening at the upper end thereof through which the internal pressure of the casing acts on an upper surface of said piston and through which condensate is drained when the drain valve port is opened; the improvement comprising:

a. a concave conical surface on one end of said central passage of the piston, wherein the smaller diameter of said conical surface is adjacent to one end of said central passage of the hollow piston; and b. a convex conical top end on said pilot valve engageable with said concave conical surface, said conical top end being separated into an impact portion and a valve portion by an annular groove about said conical top, said impact portion having at least one pressure passage groove on its outer surface.

2. An improved bell-float type stream trap according to claim 1, wherein said valve portion of the convex conical top end of the pilot valve comprises a cylindrical needle valve having a convex conical end mounted at the top of said valve stem in a manner movable relative to said valve stem, such that said convex conical top end is engageable with concave conical surface and said impact portion comprises a valve holding ring partially surrounding said needle valve and attached to the valve stem, said valve holding ring having a convex conical end, with at least one pressure passage on its surface, to engage said concave conical surface.

3. A bell-float type steam trap according to claim 2, wherein said needle valve has at least one annular groove bored along the cylindrical peripheral surface thereof just below said convex conical end.

* * * * *